(12) United States Patent
Shimizu et al.

(10) Patent No.: US 7,506,554 B2
(45) Date of Patent: Mar. 24, 2009

(54) MAGNETOSTRICTIVE TORQUE SENSOR SYSTEM AND ELECTRIC STEERING SYSTEM

(75) Inventors: Yasuo Shimizu, Shimotsuke (JP);
Yoshito Nakamura, Kawachi-gun (JP);
Shunichiro Sueyoshi, Shioya-gun (JP);
Atsuhiko Yoneda, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/818,071

(22) Filed: Jun. 13, 2007

(65) Prior Publication Data

US 2007/0240522 A1 Oct. 18, 2007

Related U.S. Application Data

(63) Continuation-in-part of application No. 11/199,914, filed on Aug. 9, 2005, now abandoned.

(30) Foreign Application Priority Data

Aug. 25, 2004 (JP) ............................ 2004-245124
Mar. 31, 2006 (JP) ............................ 2006-096584

(51) Int. Cl.
*G01L 3/00* (2006.01)
(52) U.S. Cl. ................................. 73/862.331
(58) Field of Classification Search ................................
73/862.331–862.338
See application file for complete search history.

(56) References Cited

U.S. PATENT DOCUMENTS

| | | | |
|---|---|---|---|
| 4,833,926 A | 5/1989 | Todoroki et al. | |
| 4,972,726 A | 11/1990 | Yoshimura et al. | |
| 4,972,727 A | 11/1990 | Yoshimura et al. | |
| 4,989,460 A | 2/1991 | Mizuno et al. | |
| 6,595,074 B2 | 7/2003 | Shimizu et al. | |
| 6,823,745 B2 | 11/2004 | Goto et al. | |

(Continued)

FOREIGN PATENT DOCUMENTS

JP 59-164932 9/1984

(Continued)

OTHER PUBLICATIONS

Japanese Office Action Dated Oct. 11, 2006.

*Primary Examiner*—Harshad Patel
*Assistant Examiner*—Octavia Davis
(74) *Attorney, Agent, or Firm*—Hamre, Schumann, Mueller & Larson, P.C.

(57) ABSTRACT

A magnetostrictive torque sensor includes first and second magnetostrictive films which are provided at a shaft and have different magnetic anisotropies; a first measurement coil and a second measurement coil which face the first magnetostrictive film; and a third measurement coil and a fourth measurement coil which face the second magnetostrictive film. A torque applied to the shaft is measured based on a variation in magnetic characteristics of the first and the second magnetostrictive films; and a failure of the magnetostrictive torque sensor is detected based on a first difference between output values from the first and the second measurement coils and a second difference between output values from the third and the fourth measurement coils. An electric steering system includes the magnetostrictive torque sensor for measuring a steering torque of the system; and an electric motor driven based on the measured magnetostrictive torque for steering the vehicle.

7 Claims, 10 Drawing Sheets

U.S. PATENT DOCUMENTS

| | | |
|---|---|---|
| 6,959,781 B2 | 11/2005 | Shimizu et al. |
| 6,966,232 B2 | 11/2005 | Asaumi et al. |
| 6,978,686 B2 | 12/2005 | Shimizu et al. |
| 7,013,741 B2 | 3/2006 | Nakamura et al. |
| 2004/0050181 A1 | 3/2004 | Shimizu et al. |
| 2004/0107781 A1 | 6/2004 | Asaumi et al. |
| 2004/0149511 A1 | 8/2004 | Shimizu et al. |
| 2004/0194559 A1 | 10/2004 | Nakamura et al. |
| 2005/0160835 A1* | 7/2005 | Masaki et al. .......... 73/862.333 |
| 2005/0235767 A1 | 10/2005 | Shimizu et al. |
| 2005/0235768 A1 | 10/2005 | Shimizu et al. |

FOREIGN PATENT DOCUMENTS

| | | |
|---|---|---|
| JP | 2002-316658 | 10/2002 |
| JP | 2003-207400 | 7/2003 |
| JP | 2004-191066 | 7/2004 |
| JP | 2004-191068 | 7/2004 |

* cited by examiner

MAGNETOSTRICTIVE TORQUE SENSOR SYSTEM AND ELECTRIC STEERING SYSTEM

CROSS REFERENCE TO RELATED APPLICATIONS

This application is a continuation of U.S. patent application Ser. No. 11/199,914, filed Aug. 25, 2004, which application is incorporated herein by reference.

BACKGROUND OF THE INVENTION

1. Field of the Invention

The present invention relates to a magnetostrictive torque sensor for measuring torque input into a shaft (e.g., a steering shaft), based on a variation in magnetic characteristics due to magnetostriction (or magnetic strain), and relates to an electric steering system having such a magnetostrictive torque sensor.

2. Description of Related Art

As a contactless magnetostrictive torque sensor, a magnetostrictive torque sensor for measuring torque based on a variation in magnetic characteristics due to magnetostriction is known. Such a magnetostrictive torque sensor is used for measuring a steering torque in a steering system for a vehicle (see Japanese Unexamined Patent Application, First Publication No. 2002-316658).

FIG. 6 is a diagram for explaining torque measurement using a conventional magnetostrictive torque sensor and failure (or trouble) detection for the magnetostrictive torque sensor. As shown in FIG. 6, magnetostrictive films 91 and 92 having different magnetic anisotropies are provided to a rotation shaft 99, and measurement coils 93 and 94 are respectively made to face the magnetostrictive films 91 and 92 (see Japanese Unexamined Patent Application, First Publication No. S59-164932). In the measurement principle of this magnetostrictive torque sensor 90, when a torque is applied to the rotation shaft 99, magnetic permeabilities of the magnetostrictive films 91 and 92 vary, and accordingly, inductances of the measurement coils 93 and 94 also vary. The torque is measured based on the variations in the inductances.

When such a magnetostrictive torque sensor is used, failure detection for the sensor is necessary when the torque is measured.

When using the above-described magnetostrictive torque sensor 90 having two magnetostrictive films 91 and 92, torque measurement is performed by computing a torque measurement output value VT3 based on the difference between a measurement output of one measurement coil 93 (called the first measurement output value VT1) and a measurement output of the other measurement coil 93 (called the second measurement output value VT2), and failure detection is performed by computing a failure detection output value VTF based on the sum of the first measurement output value VT1 and the second measurement output value VT2 and by comparing the failure detection output value VTF with a specific threshold.

FIG. 7 is a diagram showing output characteristics when the torque measurement output value VT3 is computed based on the following formula (1), and FIG. 8 is a diagram showing output characteristics when the failure detection output value VTF is computed based on the following formula (2).

$$VT3 = k \cdot (VT1 - VT2) + V0 \quad (1)$$

$$VTF = |VT1 + VT2| - C \quad (2)$$

In the above formulas, k, V0, and C are constants.

Generally, a magnetostrictive film has temperature characteristics in which the higher the temperature, the higher the magnetic permeability. Therefore, in the magnetostrictive torque sensor 90, when the magnetic permeabilities of the magnetostrictive films 91 and 92 vary according to a variation in temperature (i.e., a temperature variation), the first measurement output value VT1 and the second measurement output value VT2 of the measurement coils 93 and 94 also vary. If the first and second measurement output values VT1 and VT2 vary as shown by the dashed lines in FIG. 7 due to a temperature variation, the torque measurement output value VT3 is scarcely affected by the temperature variation because VT3 is the difference between the first and second measurement output values VT1 and VT2. Therefore, in this case, the torque measurement output value VT3 is accurate even when there is a temperature variation.

However, the failure detection output value VTF is the sum of the first and second measurement output values VT1 and VT2. Therefore, when VT1 and VT2 vary as shown by the dashed lines in FIG. 8 due to a temperature variation, the failure detection output value VTF is also affected by the temperature variation. Accordingly, the failure detection output value VTF may exceed (or deviate from) a failure detection threshold range A (see the bold dashed line in FIG. 8), and it is determined that the torque sensor is out of order failure even when the sensor normally operates.

In addition, when the above-described magnetostrictive torque sensor is mounted in a vehicle and the magnetic field in the vehicle interior changes due to a magnet built in a road or to activation of an actuator (e.g., a starter motor) using a large current, the first measurement output value VT1 and the second measurement output value VT2 may vary. FIG. 9 is a diagram showing output characteristics for torque measurement using a conventional magnetostrictive torque sensor, so as to explain influence of variation in the magnetic field. When the first measurement output value VT1 and the second measurement output value VT2 vary as shown by the dashed lines in FIG. 9 due to a variation in the magnetic field, the torque measurement output value VT3 is scarcely affected by the variation in the magnetic field because VT3 is the difference between the first and second measurement output values VT1 and VT2. Therefore, in this case, the torque measurement output value VT3 is accurate even when there is a variation in the magnetic field.

However, the failure detection output value VTF is the sum of the first and second measurement output values VT1 and VT2. FIG. 10 is a diagram showing an example of a variation in the output value when the magnetic field varies. FIG. 11 is a diagram showing output characteristics for failure detection using a conventional magnetostrictive torque sensor, so as to explain the influence of variation in the magnetic field. When VT1 and VT2 vary as shown by the dashed lines in FIG. 11 due to a variation in the magnetic field, the failure detection output value VTF is also affected by the variation in the magnetic field. Accordingly, the failure detection output value VTF may exceed a failure detection threshold range A (see FIG. 10 and the bold dashed line in FIG. 11), and it may be determined that the torque sensor is out of order even when the sensor is operating normally.

SUMMARY OF THE INVENTION

In light of the above circumstances, an object of the present invention is to provide a magnetostrictive torque sensor for performing failure detection without influence of a variation in the temperature or the magnetic field, and to provide a highly-reliable electric steering system having such a magnetostrictive torque sensor.

Therefore, the present invention provides a magnetostrictive torque sensor (e.g., a magnetostrictive torque sensor 30 in an embodiment explained later) comprising:

a first magnetostrictive film (e.g., a first magnetostrictive film 31 in the embodiment) and a second magnetostrictive film (e.g., a second magnetostrictive film 32 in the embodiment), which are provided at a shaft (e.g., a steering shaft 1 in the embodiment) and have different magnetic anisotropies;

a first measurement coil (e.g., a first measurement coil 33 in the embodiment) and a second measurement coil (e.g., a second measurement coil 34 in the embodiment) which face the first magnetostrictive film; and a third measurement coil (e.g., a third measurement coil 35 in the embodiment) and a fourth measurement coil (e.g., a fourth measurement coil 36 in the embodiment) which face the second magnetostrictive film, wherein:

a torque applied to the shaft is measured based on a variation in magnetic characteristics of the first and the second magnetostrictive films; and a failure of the magnetostrictive torque sensor is detected based on a first difference between output values from the first and the second measurement coils and a second difference between output values from the third and the fourth measurement coils.

The failure of the magnetostrictive torque sensor may be detected (i) when at least one of the first difference and the second difference exceeds a predetermined threshold range, (ii) when the sum of the first difference and the second difference exceeds a predetermined threshold range, or (iii) when a difference between the first difference and the second difference exceeds a predetermined threshold range.

In a typical example, the torque applied to the shaft is measured based on (i) one of a third difference between output values from the first and the third measurement coils, and a fourth difference between output values from the second and the fourth measurement coils, or (ii) a difference between a third difference between output values from the first and the third measurement coils and a fourth difference between output values from the second and the fourth measurement coils.

According to the above structure, it is possible to cancel a variation in magnetic characteristics due to a variation in the temperature or the magnetic field, thereby performing failure detection of the magnetostrictive torque sensor with high accuracy without the measurement being affected by a variation in the temperature or the magnetic field. Therefore, reliability of the magnetostrictive torque sensor can be improved.

The present invention also provides an electric steering system for a vehicle, comprising:

a magnetostrictive torque sensor as described above, for measuring a steering torque of the steering system;

an electric motor for steering the vehicle; and a control device for driving the electric motor based on the measured magnetostrictive torque.

According to the above structure, it is possible to prevent erroneous determination due to a variation in the temperature or the magnetic field that the magnetostrictive torque sensor for measuring the steering torque of the electric steering system is out of order though the sensor is not actually out of order, thereby improving reliability of the electric steering system.

The present invention also provides a magnetostrictive torque sensor (e.g., a magnetostrictive torque sensor 300 in an embodiment explained later) for a vehicle, wherein:

the vehicle has a steering shaft, an upper end of which is coupled with an operating device (e.g., a steering wheel 2 in the embodiment), and a lower end of which is coupled with a gear mechanism (e.g., a pinion 7 and a rack (teeth) 8a in the embodiment) contained in a steering gear box (e.g., a steering gear box 20 in the embodiment) in an engine room, and the magnetostrictive torque sensor comprises:

a first magnetostrictive film (e.g., a first magnetostrictive film 31 in the embodiment) and a second magnetostrictive film (e.g., a second magnetostrictive film 32 in the embodiment), which are provided at the steering shaft, wherein a torque input into the steering shaft is measured based on a variation in magnetic characteristics of the magnetostrictive films;

a first measurement coil (e.g., a first measurement coil 33 in the embodiment) and a second measurement coil (e.g., a second measurement coil 34 in the embodiment) which face the first magnetostrictive film; and a third measurement coil (e.g., a third measurement coil 35 in the embodiment) and a fourth measurement coil (e.g., a fourth measurement coil 36 in the embodiment) which face the second magnetostrictive film, wherein:

the first measurement coil, the second measurement coil, the third measurement coil, and the fourth measurement coil are arranged in this order along the axis of the steering shaft, wherein the first measurement coil is closest to the operation device; and an abnormal state of the magnetostrictive torque sensor is detected based on the sum (e.g., a failure detection voltage VTF in the embodiment) of an intermediate output signal (e.g., an intermediate voltage MVT1 in the embodiment) between the first measurement coil and the third measurement coil, and an intermediate output signal (e.g., an intermediate voltage MVT2 in the embodiment) between the second measurement coil and the fourth measurement coil.

Typically, the intermediate output signal between the first measurement coil and the third measurement coil corresponds to a difference between signals output from these measurement coils; and the intermediate output signal between the second measurement coil and the fourth measurement coil corresponds to a difference between signals output from these measurement coils.

When the steering shaft has a temperature gradient, and the first and second magnetostrictive films also have a temperature gradient (i.e., the lower the position, the higher the temperature), a part where the first measurement coil is arranged has a lower temperature, a part where the second and third measurement coils are arranged has a medium temperature, and a part where the fourth measurement coil is arranged has a higher temperature. In the above magnetostrictive torque sensor, an abnormal state (i.e., a failure) of the sensor is detected based on the sum of the intermediate output signal between the first measurement coil and the third measurement coil, and the intermediate output signal between the second measurement coil and the fourth measurement coil. In this case, the above some of the intermediate output signal between the first and third measurement coils and the second and fourth measurement coils can substantially coincide with a specific value (e.g., 5V), thereby preventing the failure detection signal from drifting even when the steering shaft has a temperature gradient. Accordingly, the failure detection range can be narrowed, thereby resulting in improvement of the failure detection accuracy.

DETAILED DESCRIPTION OF THE INVENTION

Hereinafter, embodiments of a magnetostrictive torque sensor and an electric steering system having the magnetostrictive torque sensor, according to the present invention, will be described with reference to FIGS. 1 to 5.

Figure 1:
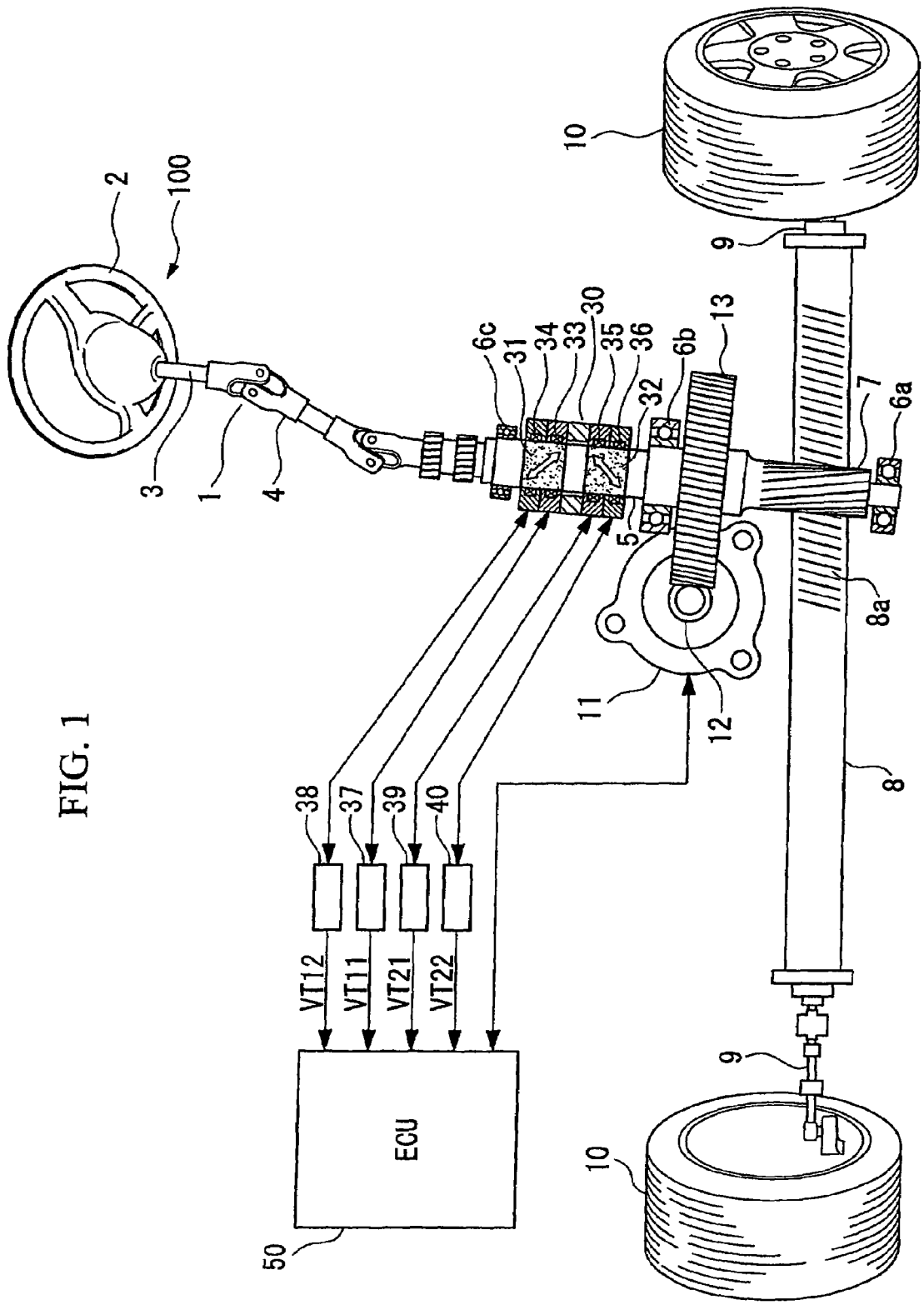
FIG. 1 is a diagram showing the general structure of an electric power steering system having a magnetostrictive torque sensor according to the present invention.

FIG. 1 is a diagram showing the general structure of an electric power steering system having a magnetostrictive torque sensor according to the present invention. As shown in FIG. 1, the electric power steering system 100 (i.e., an electric steering system of the present invention) for a vehicle has a steering shaft 1 coupled with a steering wheel 2 (i.e., a steering device). The steering shaft 1 consists of a main steering shaft 3 integrally coupled with the steering wheel 2 and a pinion shaft 5 at which a pinion 7 of a rack and pinion mechanism is provided. The main steering shaft 3 and the pinion shaft 5 are coupled with each other via a universal joint 4.

A lower portion, an intermediate portion, and an upper portion of the pinion shaft 5 are respectively supported by bearings 6a, 6b, and 6c, and the pinion 7 is attached to a lower end of the pinion shaft 5. The pinion 7 engages with a rack (teeth) 8a of a rack shaft 8 which can perform reciprocation in the width of the vehicle. To either end of the rack shaft 8, right and left front wheels 10 are coupled as steered wheels via tie rods 9. According to the above structure, an ordinary rack and pinion steering operation can be performed by operating the steering wheel 2, thereby steering the front wheels 10 and turning the vehicle. The rack shaft 8, the rack 8a, and the tie rods 9 constitute a steering mechanism.

The electric power steering system 100 also includes an electric motor 11 for supplying assistant steering power so as to reduce the steering power generated by the steering wheel 2. A worm gear 12 provided at an output shaft of the electric motor 11 engages with a worm wheel gear 13 provided below the intermediate bearing 6b at the pinion shaft 5.

Between the intermediate bearing 6b and the upper bearing 6c at the pinion shaft 5, a magnetostrictive torque sensor 30 is provided, which measures torque based on a variation in magnetic characteristics due to magnetostriction.

The magnetostrictive torque sensor 30 generally has (i) a first magnetostrictive film 31 and a second magnetostrictive film 32, each having an annular form along the whole circumference on the outer peripheral surface of the pinion shaft 5, (ii) a first measurement coil 33 and a second measurement coil 34 which face the first magnetostrictive file 31, (iii) a third measurement coil 35 and a fourth measurement coil 36 which face the second magnetostrictive film 32, and (iv) measurement circuits 37, 38, 39, and 40 which are respectively connected to the first, second, third, and fourth measurement coils 33, 34, 35, and 36.

The first and second magnetostrictive films 31 and 32 are metal films made of a material which exhibits a large variation in permeability under strain. For example, each film may be a Ni—Fe alloy film formed at the outer periphery of the pinion shaft 5 by plating.

The first magnetostrictive film 31 has magnetic anisotropy in a direction inclined by approximately 45 degrees from the axis of the pinion shaft 5, and the second magnetostrictive film 32 has magnetic anisotropy in a direction inclined by approximately 90 degrees from the direction of the magnetic anisotropy of the first magnetostrictive film 31. Therefore, magnetic anisotropies of the first and second magnetostrictive films 31 and 32 have a phase difference of approximately 90 degrees.

The first measurement coil 33 and the second measurement coil 34 are coaxially arranged around the first magnetostrictive film 31, where a specific gap is provided between the coils and the magnetostrictive film, and positions of the coils are different along the axis of the pinion shaft 5.

The third measurement coil 35 and the fourth measurement coil 36 are coaxially arranged around the second magnetostrictive film 32, where a specific gap is provided between the coils and the magnetostrictive film, and positions of the coils are different along the axis of the pinion shaft 5.

According to the above-described magnetic anisotropies of the first and second magnetostrictive films 31 and 32, when a torque is applied to the pinion shaft 5, compressive force is applied to one of the first and second magnetostrictive films 31 and 32, and tensile force is applied to the other of the first and second magnetostrictive films 31 and 32. As a result, the permeability of one of the magnetostrictive films increases while the permeability of the other magnetostrictive film decreases. Accordingly, the inductances of the two measurement coils arranged around said one of the magnetostrictive films increase while the inductances of the two measurement coils arranged around the other of the magnetostrictive films decrease.

The first, second, third, and fourth measurement coils 33, 34, 35, and 36 are connected to the measurement circuits 37, 38, 39, and 40 which respectively have conversion circuits. In the measurement circuits 37, 38, 39, and 40, variations in the inductance of the measurement coils 33, 34, 35, and 36 are converted to voltage variations which are output to an electronic control unit (ECU) 50.

Based on the voltages output from the measurement circuits 37 to 40, the ECU 50 performs measurement of steering torque applied to the pinion shaft 5 and failure (or trouble) detection of the magnetostrictive torque sensor 30. Below, the method of computing a torque measurement voltage VT3 and a failure detection voltage VTF in the present embodiment will be explained.

Here, voltages output from the measurement circuits 37, 38, 39, and 40 are respectively called VT11, VT12, VT21, and VT22.

In order to measure the torque measurement voltage VT3, first, (i) differential voltages VT31 and VT32 are computed using formulas (3) and (4), or (ii) differential voltages VT31 and VT33 are computed using formulas (3) and (5).

$$VT31 = VT11 - VT21 + V0 = k11 \cdot T - (-k21 \cdot T) = (k11 + k21)T \quad (3)$$

$$VT32 = VT12 - VT22 + V0 = k12 \cdot T - (-k22 \cdot T) = (k12 + k22)T \quad (4)$$

$$VT33 = VT22 - VT12 + V0 = -k22 \cdot T - (k12 \cdot T) = -(k12 + k22)T \quad (5)$$

In the above formulas, k11, k12, k21, and k22 are proportional constants, V0 is a constant, and T indicates a steering torque.

Therefore, the differential voltage VT31 is a differential voltage (i.e., a differential output value) between the first measurement coil 33 facing the first magnetostrictive film 31 and the third measurement coil 35 facing the second magnetostrictive film 32, and the differential voltage VT32 and the differential voltage VT33 are differential voltages (i.e., differential output values) between the second measurement coil 34 facing the first magnetostrictive film 31 and the fourth measurement coil 36 facing the second magnetostrictive film 32.

As the torque measurement voltage VT3, one of VT31 and VT32 is used. In formula (3), k11 and k21 are almost equal; thus, VT31 has a gain approximately twice the gain of VT11 or VT21 for measuring the steering torque T. Similarly, in formula (4), k12 and k22 are almost equal; thus, VT32 has a gain approximately twice the gain of VT12 or VT22 for measuring the steering torque. According to the doubled gain, sensitivity is also doubled.

In another method, the torque measurement voltage VT3 can be computed based on a difference between the differential voltages VT31 and VT33, by the following formula (6).

$$VT3 = VT31 - VT33 + V0 = (k11 + k12 + k21 + k22)T \quad (6)$$

According to formula (6), VT3 is effective for quadrupling the sensitivity in comparison with VT11 to VT22.

In computation of the failure detection voltage VTF, first, differential voltages VTF1 and VTF2 are computed by the following formulas (7) and (8).

$$VTF1 = VT11 - VT12 \quad (7)$$

$$VTF2 = VT21 - VT22 \quad (8)$$

That is, the differential voltage VTF1 (i.e., the first differential signal) is a differential voltage (i.e., a differential output value) between the first measurement coil 33 and the second measurement coil 34 which face the first magnetostrictive film 31, and the differential voltage VTF2 (i.e., the second differential signal) is a differential voltage (i.e., a differential output value) between the third measurement coil 35 and the fourth measurement coil 36 which face the second magnetostrictive film 32.

When at least one of VTF1 and VTF2 exceeds (or deviates from) a failure detection threshold range A, it is determined that the sensor is out of order.

In another method, a failure detection voltage VTF3 is computed by the sum or the difference of the differential voltages VTF1 and VTF2 by the following formula (9) or (10).

$$VTF3 = VTF1 + VTF2 \quad (9)$$

$$VTF3 = VTF1 - VTF2 \quad (10)$$

In this case, when VTF3 exceeds from the failure detection threshold range A, it is determined that the sensor is out of order.

According to the measured torque measurement voltage VT31, VT32, or VT33, the ECU 50 sets a target current of the electric motor 11, and drives the electric motor 11 at the target current so as to generate assistant steering power and to steer the vehicle. In addition, when the failure detection output value VTF1, VTF2, or VTF3 exceeds the predetermined threshold range A, the ECU50 determines that the magnetostrictive torque sensor 30 is out of order.

The first magnetostrictive film 31 and the second magnetostrictive film 32 have a temperature characteristic in which the higher the temperature, the higher the permeability. Therefore, even when the same torque is applied to the pinion shaft 5, the voltages VT1, VT2, VT3, and VT4, which are respectively output from the measurement circuits 37, 38, 39, and 40, vary according to a temperature variation.

Figure 2:
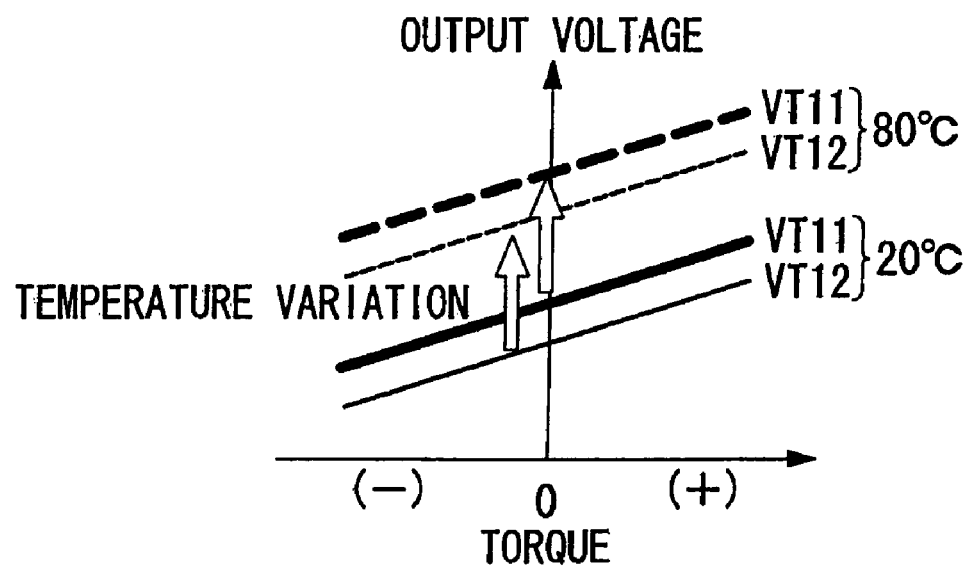
FIG. 2 is a diagram showing output characteristics of the first and the second measurement coils of the magnetostrictive torque sensor.

FIG. 2 is a diagram showing output characteristics of the output voltages VT11 and VT12 from the measurement circuits 37 and 38 which respectively correspond to the first and the second measurement coils 33 and 34 for the first magnetostrictive film 31. In FIG. 2, solid lines show characteristics at a temperature of 20° C., and dashed lines show characteristics at a temperature of 80° C.

Figure 3:
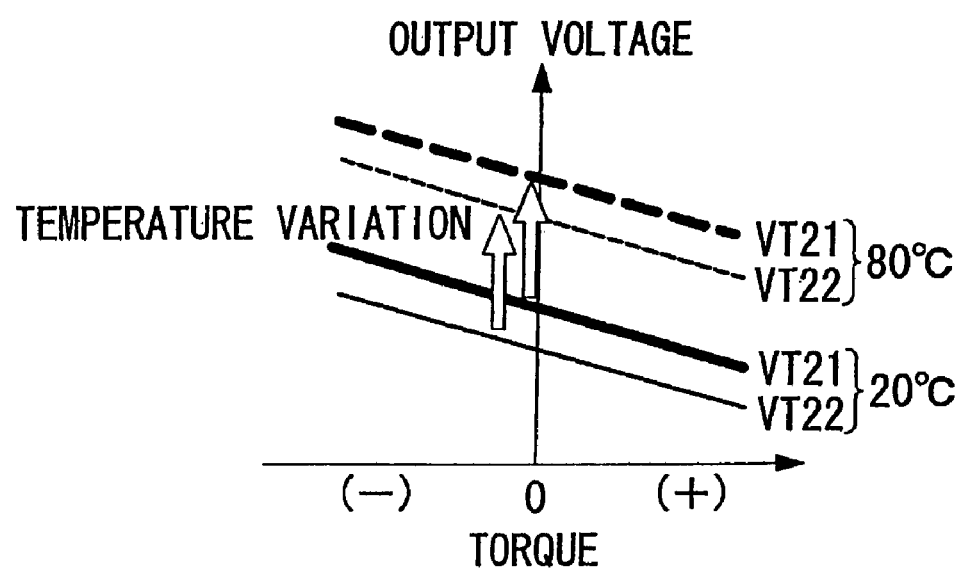
FIG. 3 is a diagram showing output characteristics of the third and the fourth measurement coils of the magnetostrictive torque sensor.

FIG. 3 is a diagram showing output characteristics of the output voltages VT21 and VT22 from the measurement circuits 39 and 40 which respectively correspond to the third and the fourth measurement coils 35 and 36 for the second magnetostrictive film 32. In FIG. 3, solid lines show characteristics at a temperature of 20° C., and dashed lines show characteristics at a temperature of 80° C.

Figure 4:
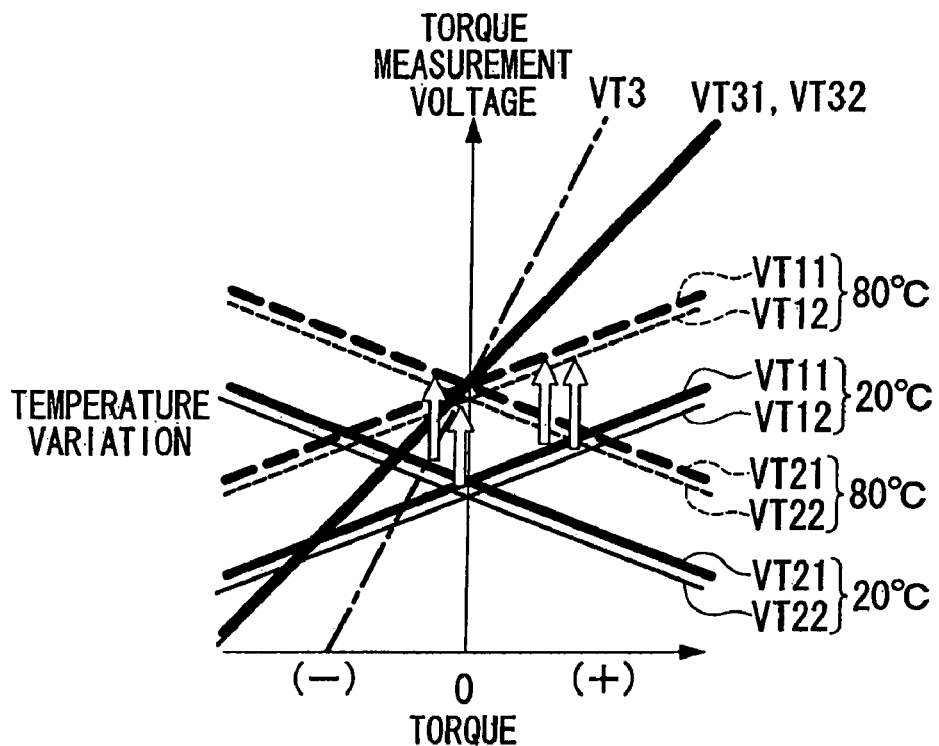
FIG. 4 is a diagram showing output characteristics in torque measurement using the magnetostrictive torque sensor.

FIG. 4 is a diagram showing output characteristics of the torque measurement voltages VT31, VT32, and VT3, in which the output voltages VT11 and VT12 and the output voltages VT21 and VT22 are shown in the same graph. As shown in this diagram, the output voltages VT11, VT12, VT21, and VT22 vary depending on the temperature; however, the differential voltage VT31 between the output voltages VT11 and VT21 and the differential voltage VT32 between the output voltages VT12 and VT22 do not vary when the temperature varies. Therefore, the torque measurement voltage VT3, which is the differential voltage VT31 or VT32, or the differential voltage between VT31 and VT32, also does not vary when the temperature varies. Accordingly, in the electric power steering system 100, torque applied to the pinion shaft 5 can be measured with high accuracy without the measurement being affected by a variation in magnetic characteristics due to a temperature variation.

Figure 5:
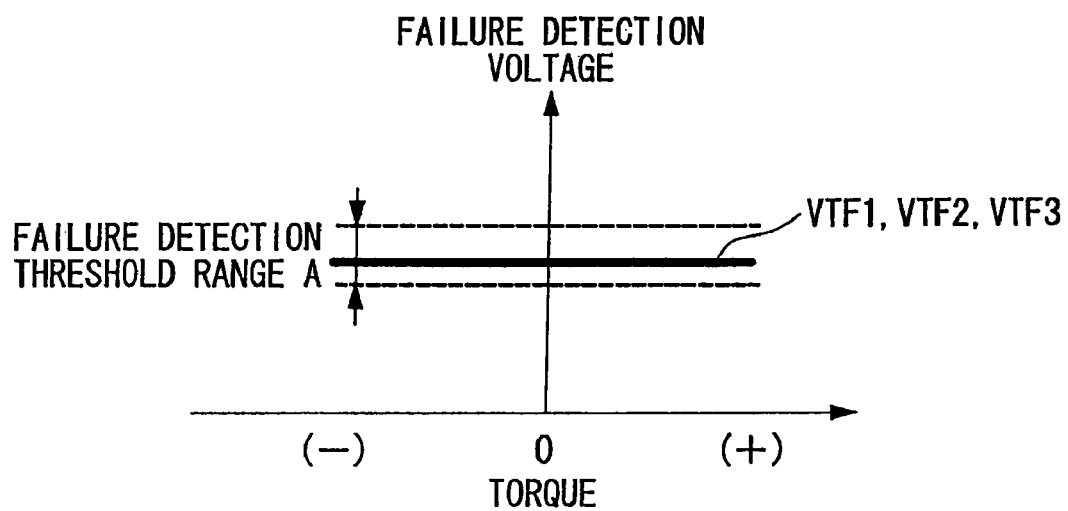
FIG. 5 is a diagram showing output characteristics in failure detection for the magnetostrictive torque sensor.

In addition, the output voltages VT11 and VT12 vary according to a temperature variation, as shown in FIG. 2; however, the differential voltage VTF1 between the output voltages VT11 and VT12 does not vary when the temperature varies. Similarly, the output voltages VT21 and VT22 vary according to a temperature variation, as shown in FIG. 3; however, the differential voltage VTF2 between the output voltages VT21 and VT22 does not vary when the temperature varies. That is, as shown in FIG. 5 (which is a diagram showing output characteristics of the magnetostrictive torque sensor 30 for failure detection), the differential voltage VTF1 or VTF2 does not vary when the temperature varies. In addition, the failure detection voltage VTF3 which is the sum or the difference of the differential voltages VTF1 and VTF2 also does not vary when the temperature varies. As a result, in the electric power steering system 100, failure detection for the magnetostrictive torque sensor 30 can be performed with high accuracy without the measurement being affected by a variation in magnetic characteristics due to a temperature variation. Accordingly, it is possible to prevent erroneous determination (due to a temperature variation) that the magnetostrictive torque sensor 30 is out of order when the sensor is not actually out of order.

In addition, when the measurement voltages VT11, VT12, VT21, and VT22 of the measurement circuits 37 to 40 vary due to a variation in the magnetic field, functions and effects are similar to those observed when there is a temperature variation. That is, also in this case, the torque measurement voltage VT31, VT32, or VT3 is computed by the above-described formula (3), (4), or (6), and the failure detection voltage VTF1, VTF2, or VTF3 is computed by the above-described formula (7), (8), (9) or (10). Therefore, torque applied to the pinion shaft 5 can be measured with high accuracy and failure detection for the magnetostrictive torque sensor 30 can be performed with high accuracy without the measurement being affected by a variation in the magnetic field. Accordingly, it is possible to prevent erroneous determination (due to a variation in the magnetic field) that the magnetostrictive torque sensor 30 is out of order though the sensor is not actually out of order.

In the above embodiment, the failure detection voltage VTF1 is computed as the difference (or the differential voltage) between the measurement voltages VT11 and VT12, and the failure detection voltage VTF2 is computed as the difference (or the differential voltage) between the measurement voltages VT21 and VT22, and the failure detection voltage VTF3 is computed as the sum or the difference of the differential voltages VTF1 and VTF2. However, instead of the above computation, the ratio of the measurement voltage VT11 to VT12 (i.e., VT11/VT12) and the ratio of the measurement voltage VT21 to VT22 (i.e., VT21/VT22) may be computed, and product of these two ratios may be computed as a failure detection output value. Based on this failure detection output value, failure detection for the magnetostrictive torque sensor 30 may be performed.

In another variation, the first magnetostrictive film 31 is divided into two portions along the axis of the pinion shaft 5, and one of the two portions is dedicatedly used as a magnetostrictive film for the first measurement coil 33, and the other is dedicatedly used as a magnetostrictive film for the second measurement coil 34. Similarly, the second magnetostrictive film 32 is divided into two portions in the axial direction of the pinion shaft 5, and one of the two portions is dedicatedly used as a magnetostrictive film for the third measurement coil 35, and the other is dedicatedly used as a magnetostrictive film for the fourth measurement coil 36. Therefore, an arrangement using four magnetostrictive films is possible.

In the computation for the failure detection output value of the magnetostrictive torque sensor 30, based on the differential voltages VT31 and VT32 which are computed by the above-described formulas (3) and (4), a failure detection voltage VTF4 may be computed by the following formula (11) (for computing the difference between VT31 and VT32), and it may be determined that the magnetostrictive torque sensor 30 is out of order when the failure detection voltage VTF4 exceeds a specific threshold B.

$$VTF4=VT31-VT32 \quad (11)$$

When failure detection is performed based on the failure detection voltage VTF4, failure detection for the magnetostrictive torque sensor 30 can also be performed with high accuracy without the measurement being affected by a variation in the temperature or the magnetic field.

As described above, the differential voltage VT31 is a differential voltage between the first measurement coil 33 facing the first magnetostrictive film 31 and the third measurement coil 35 facing the second magnetostrictive film 32, and the differential voltage VT32 is a differential voltage between the second measurement coil 34 facing the first magnetostrictive film 31 and the fourth measurement coil 36 facing the second magnetostrictive film 32.

Figure 6:
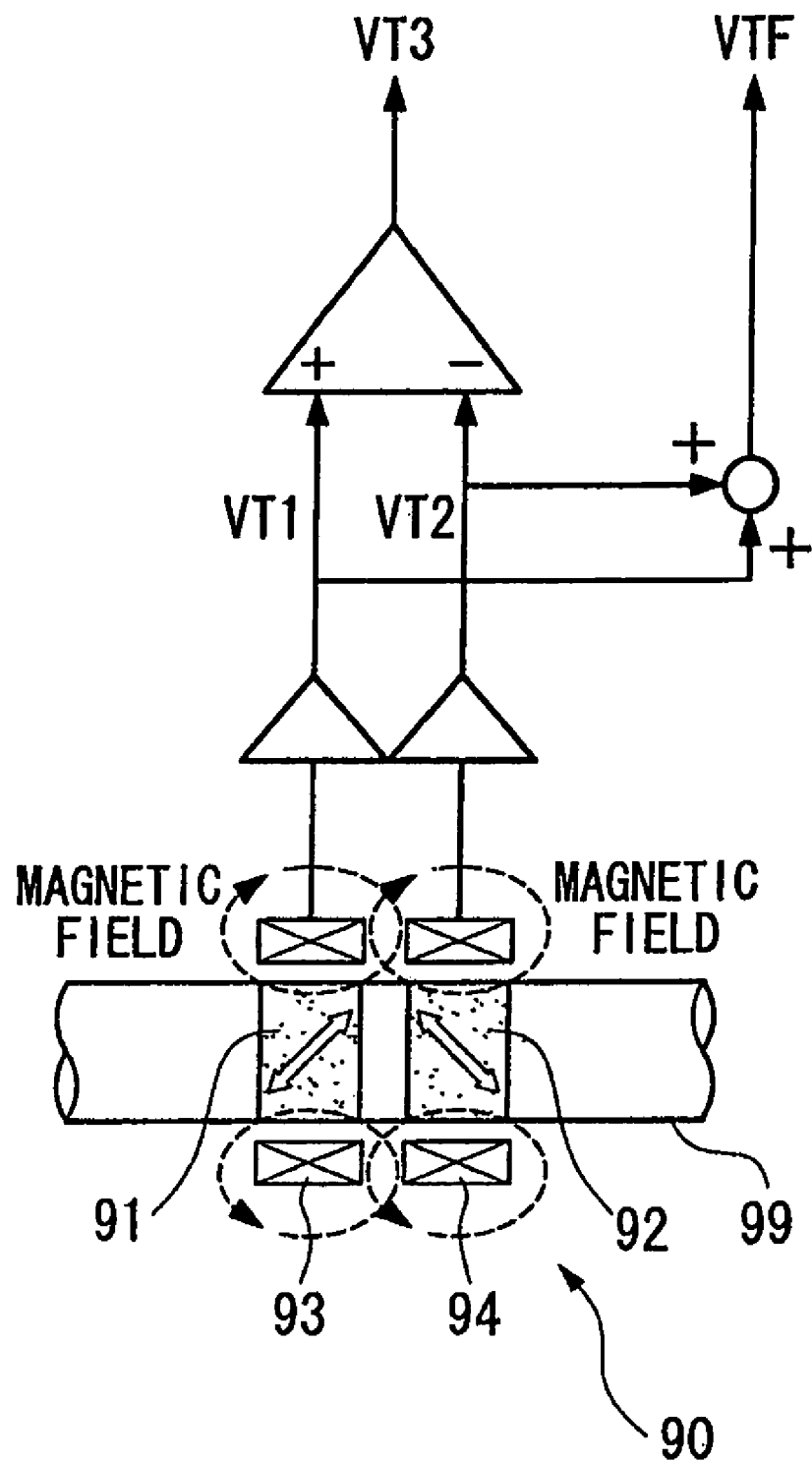
FIG. 6 is a diagram for explaining torque measurement using a conventional magnetostrictive torque sensor and failure detection for the magnetostrictive torque sensor.
Figure 7:
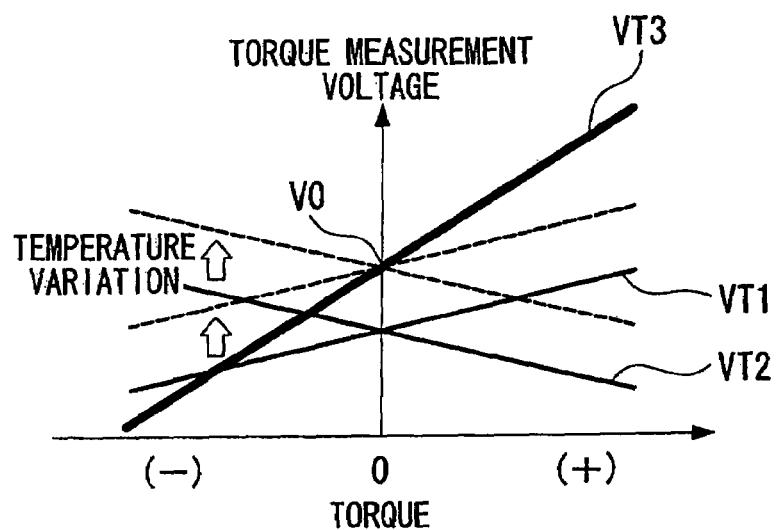
FIG. 7 is a diagram showing output characteristics in torque measurement using the conventional magnetostrictive torque sensor, so as to explain influence of variation in the temperature.
Figure 8:
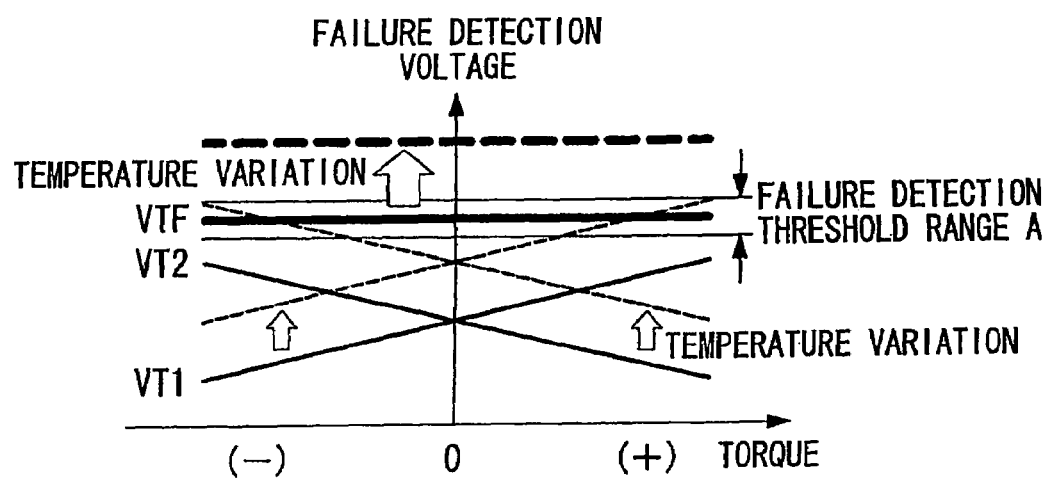
FIG. 8 is a diagram showing output characteristics in failure detection for the conventional magnetostrictive torque sensor, so as to explain influence of variation in the temperature.
Figure 9:
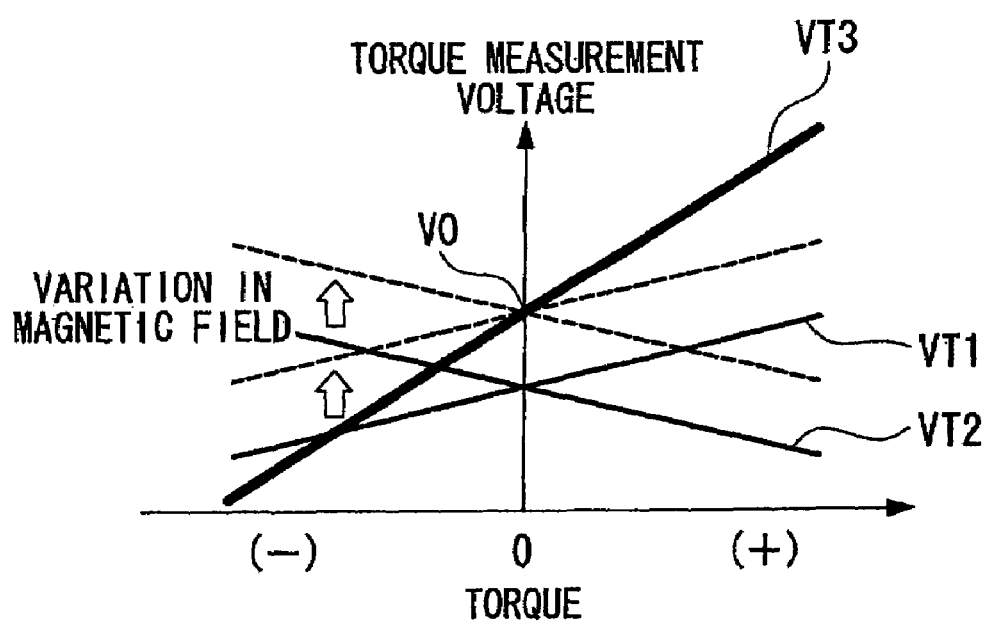
FIG. 9 is a diagram showing output characteristics in torque measurement using the conventional magnetostrictive torque sensor, so as to explain influence of variation in the magnetic field.
Figure 10:
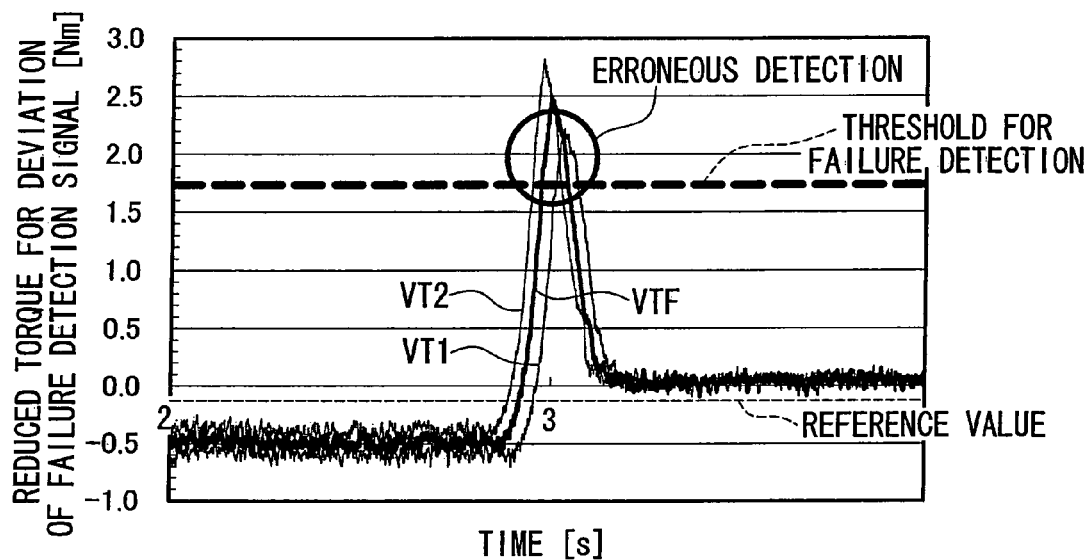
FIG. 10 is a diagram showing an example of a variation in the output value of the conventional magnetostrictive torque sensor when the magnetic field varies.
Figure 11:
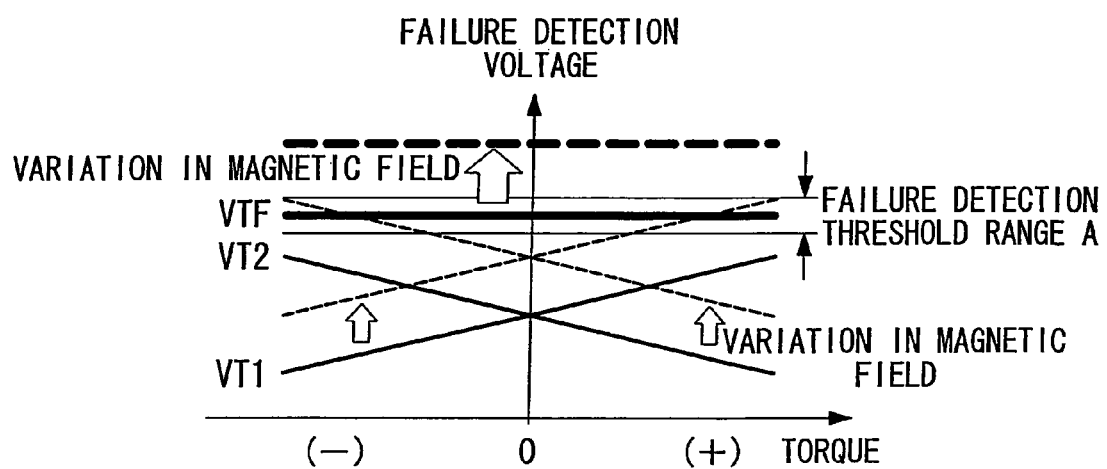
FIG. 11 is a diagram showing output characteristics in failure detection for the conventional magnetostrictive torque sensor, so as to explain influence of variation in the magnetic field.
Figure 12:
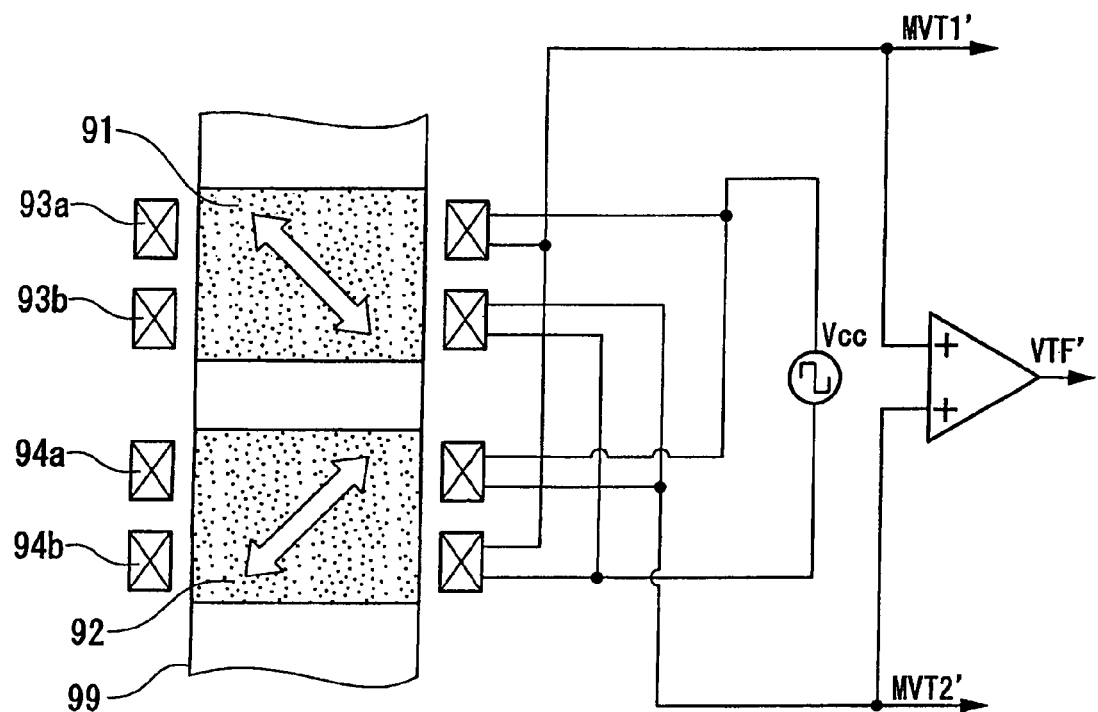
FIG. 12 is a diagram showing a variation of the magnetostrictive torque sensor in accordance with the present invention, the diagram corresponding to the structure shown in FIG. 6.

FIG. 12 shows a variation of the magnetostrictive torque sensor, corresponding to the structure shown in FIG. 6.

In FIG. 12, a pair of measurement coils 93a and 93b faces a magnetostrictive film 91 (one of two magnetostrictive films), wherein the positions of the coils are different along the axial direction, and another pair of measurement coils 94a and 94b faces another magnetostrictive film 92, wherein the positions of the coils are also different along the axial direction. An intermediate voltage MVT1' between the measurement coils 93a and 94b at both ends (i.e., the highest and lowest coils in FIG. 12) is measured, and an intermediate voltage MVT2' between the measurement coils 93b and 94a at middle positions is measured. Here, the "intermediate voltage" corresponds to the differential voltage in the above embodiment. A torque is measured based on the intermediate voltages MVT1' and MVT2', and a failure detection (output) signal VTF' is calculated using the sum of the intermediate voltages MVT1' and MVT2'. A failure (i.e., an abnormal state) of the magnetostrictive torque sensor is detected based on the failure detection signal VTF'.

When the above magnetostrictive torque sensor is used as a steering torque sensor for measuring the steering torque of a vehicle, the steering torque sensor is provided to a steering shaft, and is positioned between a steering wheel and a steering gear box. When this vehicle runs at a high vehicle speed and then stops, the steering gear box is heated due to the heated engine, and the steering shaft is also heated. Here, the temperature distribution of the steering shaft is not uniform, and a lower part of the steering shaft, which is closer to the engine, has a higher temperature in comparison with a higher part (of the steering shaft) which is distant from the engine. Therefore, a part where the lowest measurement coil 94b is arranged has a higher temperature, a part where the highest measurement coil 93a is arranged has a lower temperature, and a part where the other measurement coils 93b and 94a are arranged has intermediate temperatures which are almost equal.

That is, the above-described intermediate voltage MVT1' is an intermediate voltage between the measurement coil 93a in a lower-temperature part and the measurement coil 94b in a higher-temperature part, and the above-described intermediate voltage MVT2' is an intermediate voltage between the measurement coils 93b and 94a, each belonging to a medium-temperature part. Here, the magnetostrictive films have a temperature characteristic in which the higher the temperature, the higher the permeability μ. Therefore, when the steering shaft has a temperature difference (i.e., temperature gradient) as described above, the absolute values of the intermediate voltages MVT1' and MVT2' do not coincide with each other, wherein they should be the same when no load is applied. Accordingly, the failure detection output value VTF' drifts, and a failure may be determined even when there is no actual failure. In order to solve this problem, the failure detection range needs a large margin, which degrades the failure detection accuracy.

Below, an embodiment of a magnetostrictive torque sensor is described, which has a high failure detection accuracy even when the steering shaft has a temperature gradient.

Figure 13:
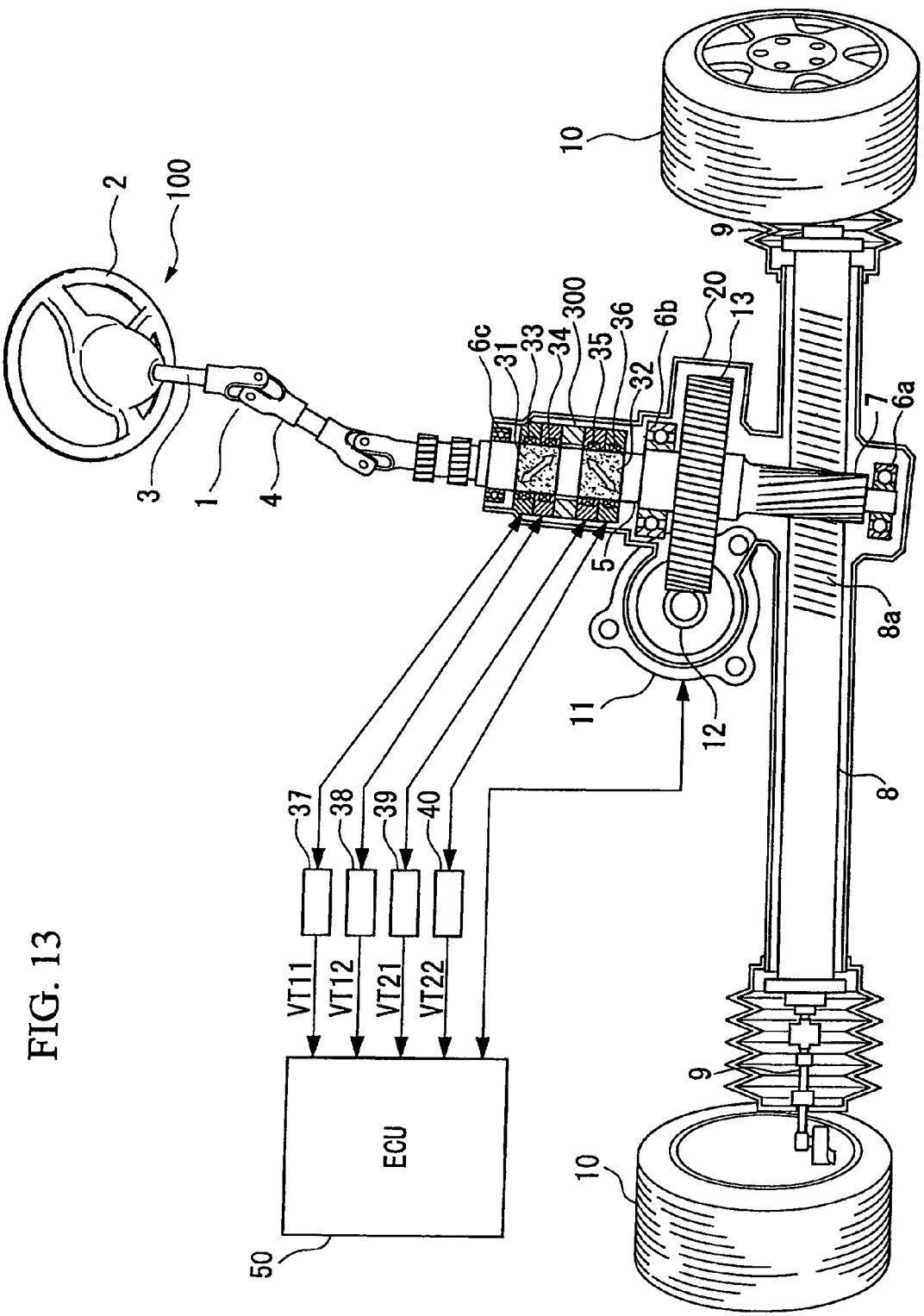
FIG. 13 is a diagram showing the general structure of an electric power steering system having another magnetostrictive torque sensor according to the present invention.

FIG. 13 shows the present embodiment, and parts identical to those in FIG. 1 are given identical reference numerals, and explanations thereof are omitted or simplified.

In the present embodiment, the pinion shaft 5, the rack shaft 8, the worm gear 12, the worm wheel gear 13, and a magnetostrictive torque sensor 300 are contained in a steering gear box 20 in an engine room (or engine space). In addition, the first magnetostrictive film 31 is arranged closer to the steering wheel 2 (i.e., at a higher position in FIG. 13) in comparison with the second magnetostrictive film 32. Therefore, the first measurement coil 33, the second measurement coil 34, the third measurement coil 35, and the fourth measurement coil 36 are arranged in order, from the side closer to the steering wheel 2.

Based on the voltages output from the measurement circuits 37 to 40 which respectively correspond to the measurement coils 33 to 36, the ECU 50 calculates a torque measurement voltage, and calculates a steering torque applied to the pinion shaft 5, based on the torque measurement voltage. The ECU 50 sets a target current of the electric motor 11 in accordance with the torque measurement voltage, and drives the electric motor 11 at the target current so as to generate assistant steering power and to steer the vehicle.

The detection of an abnormal state of the sensor (i.e., failure detection) in the present embodiment will be explained below.

With respect to the voltages VT11, VT12, VT21, and VT22, which are respectively output from the measurement circuits 37 to 40, intermediate voltages MVT1 and MVT2 are computed in accordance with the following formulas (12) and (13).

$$MVT1=VT11-VT21+V0=k11 \cdot T-(-k21 \cdot T)=(k11+k21)T \quad (12)$$

$$MVT2=VT12-VT22+V0=k12 \cdot T-(-k22 \cdot T)=(k12+k22)T \quad (13)$$

wherein k11, k12, k21, and k22 are proportional constants, V0 is a constant, and T indicates a steering torque.

That is, the intermediate voltage MVT1 is an intermediate voltage (i.e., intermediate output signal) between the first measurement coil 33, which faces the first magnetostrictive film 31 and is arranged at the highest position, and the third measurement coil 35, which faces the second magnetostrictive film 32 and is arranged at the third position (counted from the highest position). On the other hand, the intermediate voltage MVT2 is an intermediate voltage (i.e., intermediate output signal) between the second measurement coil 34, which faces the first magnetostrictive film 31 and is arranged at the second position (counted from the highest position), and the fourth measurement coil 36, which faces the second magnetostrictive film 32 and is arranged at the lowest position.

In the next step, the sum of the intermediate voltages MVT1 and MVT2 is computed, which is referred to as the failure detection voltage VTF (see the following formula (14)).

$$VTF=MVT1+MVT2 \quad (14)$$

In the above case of using the sum of the intermediate voltages MVT1 and MVT2 as the failure detection voltage VTF, accurate failure detection can be performed even when a temperature variation occurs in the whole body of the steering shaft 1.

In the present embodiment, the steering gear box 20 is arranged in the engine room. Therefore, in accordance with the driving state of the vehicle, the steering gear box 20 may receive heat from the engine, and the temperature of the steering gear box 20 may be increased. For example, when the vehicle is stopped after a high-speed running operation, the steering gear box 20 is heated by the heat of the engine, and the steering shaft 1 is also heated. Here, the steering shaft 1 has a non-uniform temperature distribution, and a lower part thereof, which is closer to the engine, has a higher temperature in comparison with a higher part, which is distant from the engine. That is, with respect to the portion where the magnetostrictive torque sensor 300 is arranged, a part having the fourth (i.e., lowest) measurement coil 36 has a higher temperature than the temperature of a part having the first (i.e., highest) measurement coil 33, and the parts having the second and third measurement coils 34 and 35 have intermediate temperatures (which are almost equal) between the temperatures of the first and fourth measurement coils 33 and 36.

As described above, in the structure shown in FIG. 12, when the steering shaft 1 has such a temperature difference (i.e., temperature gradient), the failure detection signal drifts due to the temperature difference (temperature gradient), and a failure may be erroneously detected if the failure detection range is narrow.

In contrast, in the magnetostrictive torque sensor 300 of the present embodiment, even when the steering shaft 1 has a temperature difference (i.e., temperature gradient), it is possible to prevent the failure detection signal from drifting, thereby improving the failure detection accuracy. This effect will be further explained with reference to FIG. 14, which explains the principle of the failure detection in the present embodiment.

The magnetostrictive films have a temperature characteristic in which the higher the temperature, the higher the permeability μ. Therefore, in the above case in which the part having the first (i.e., highest) measurement coil 33 has a lower temperature, the second and third measurement (i.e., intermediate) coils 34 and 35 have intermediate temperatures, and the fourth (i.e., lowest) measurement coil 36 has a higher temperature, (i) a part of the first magnetostrictive film 31, which faces the first measurement coil 33, has a smaller permeability μ1, (ii) a part of the second magnetostrictive film 32, which faces the fourth measurement coil 36, has a higher permeability μ4, and (iii) a part of the first magnetostrictive film 31, which faces the second measurement coil 34, and a part of the second magnetostrictive film 32, which faces the third measurement coil 35, respectively have permeabilities μ2 and μ3, which are larger than μ1 and smaller than μ4, that is, have intermediate values (i.e., μ1<μ2 (μ3)<μ4).

In addition, it is known that the permeability μ of the magnetostrictive film is proportional to an impedance Z of the measurement coil. Therefore, when there is a temperature gradient as described above, the first measurement coil 33 has a smaller impedance Z1, the fourth measurement coil 36 has a larger impedance Z4, and the second and third measurement circuits 34 and 35 respectively have impedances Z2 and Z3, which have intermediate values between Z1 and Z4 (i.e., Z1<Z2(Z3)<Z4).

Figure 14:
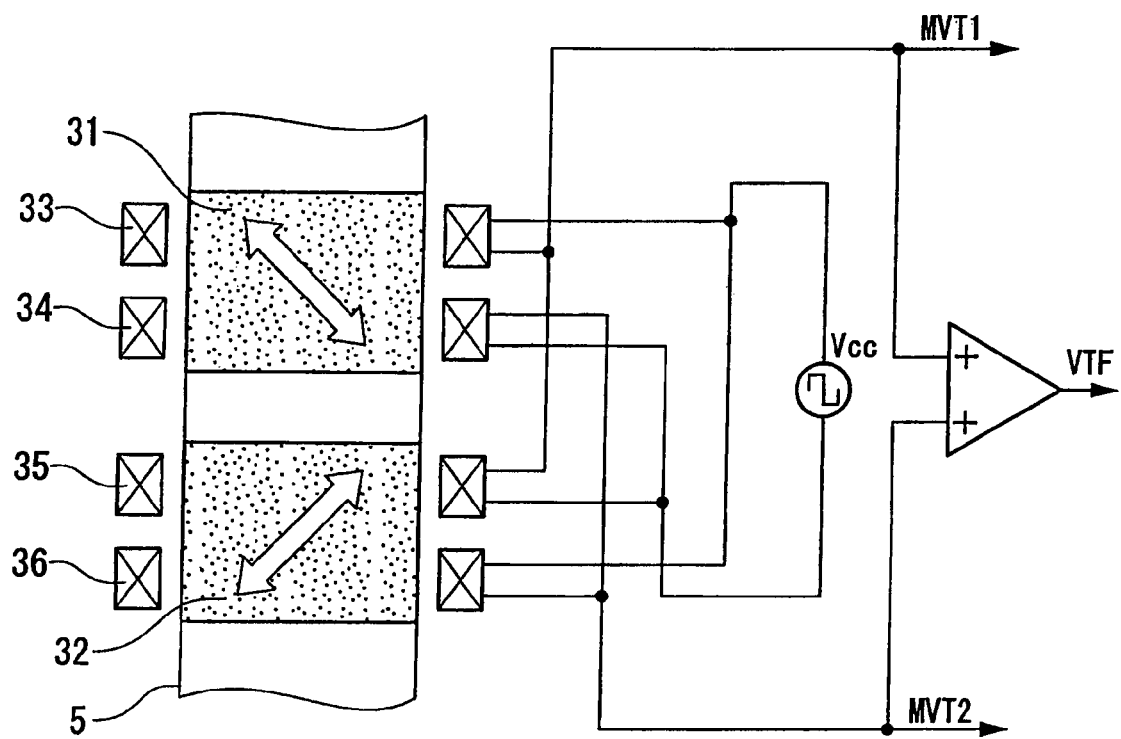
FIG. 14 is a diagram explaining the principle of the failure detection in the magnetostrictive torque sensor of FIG. 13.

In FIG. 14, "Vcc" indicates an excitation voltage applied to the measurement coils 33 to 36. When a midpoint voltage measured at a middle point between the first measurement coil 33 and the third measurement coil 35 is indicated by "VS1", and a midpoint voltage measured at a middle point between the second measurement coil 34 and the fourth measurement coil 36 is indicated by "VS2", each of the midpoint voltages VS1 and VS2 corresponds to a value obtained by a voltage division between the relevant coils (see the following formulas).

$$VS1 = Vcc \times (Z3/(Z1+Z3)) = Vcc \times (1/((Z1/Z3)+1)) \quad (15)$$

$$VS2 = Vcc \times (Z2/(Z2+Z4)) = Vcc \times (1/((Z4/Z2)+1)) \quad (16)$$

Accordingly, the sum of the midpoint voltage VS1 between the first measurement coil 33 and the third measurement coil 35 and the midpoint voltage VS2 between the second measurement coil 34 and the fourth measurement coil 36 can be maintained almost constant (e.g., 5V). Therefore, as described above, it is possible to prevent the failure detection signal from drifting due to a temperature gradient.

As a result, even when the steering shaft 1 has a temperature gradient, a constant failure detection signal can be obtained. Therefore, a wider failure detection range in comparison with the structure shown in FIG. 12 can be obtained, thereby improving the failure detection accuracy.

Below, concrete examples using numeric values are shown so as to verify differences between the present embodiment and the structure shown in FIG. 12.

It is assumed that when the measurement coils 33 to 36 are excited using a rectangular-wave voltage of 30 kHz, a temperature gradient occurs in the steering shaft 1, and the impedances Z1 to Z4 of the measurement coils 33 to 36 become respectively Z1=900Ω, Z2=950Ω, Z3=1000Ω, and Z4=1050Ω.

In the magnetostrictive torque sensor shown in FIG. 12, the sum of the intermediate voltage MVT1' between the first measurement coil 33 and the fourth measurement coil 36, and the intermediate voltage MVT2' between the second measurement coil 34 and the third measurement coil 35 is used as the failure detection signal VTF' (i.e., VTF'=MVT1'+MVT2'), and failure detection is performed based on the failure detection signal VTF'. Therefore, the failure detection signal VTF' is affected by a midpoint voltage VS1' between the first measurement coil 33 and the fourth measurement coil 36, and a midpoint voltage VS2' between the second measurement coil 34 and the third measurement coil 35.

In FIG. 12, "Vcc" also indicates an excitation voltage applied to the measurement coils 33 to 36, and VS1' and VS2' can be indicated by the following formulas:

$$VS1' = Vcc \times (Z4/(Z1+Z4)) = Vcc \times (1/((Z1/Z4)+1)) \quad (17)$$

$$VS2' = Vcc \times (Z3/(Z2+Z3)) = Vcc \times (1/((Z2/Z3)+1)) \quad (18)$$

When Vcc is 5V, VS1' and VS2' can be computed by substituting the above impedance values for Z1 to Z4 into the above formulas, and VTF' can also be computed by VS1' and VS2', as follows:

$$VS1' = 2.692308(V)$$

$$VS2' = 2.564102(V)$$

$$VTF' = VS1' + VS2' = 5.25641(V)$$

In contrast, in the magnetostrictive torque sensor 300 of the present embodiment, the sum of the intermediate voltage MVT1 between the first measurement coil 33 and the third measurement coil 35 and the intermediate voltage MVT2 between the second measurement coil 34 and the fourth measurement coil 36 is referred to as the failure detection signal VTF (i.e., VTF=MVT1+MVT2), and failure detection is performed based on the failure detection signal VTF. Therefore, the failure detection signal VTF is affected by the midpoint voltage VS1 between the first measurement coil 33 and the second measurement coil 35, and the midpoint voltage VS2 between the second measurement coil 34 and the fourth measurement coil 36.

When VS1 and VS2 are computed using the above formulas (15) and (16) under the same conditions as those set for computing VTF', the failure detection signal VTF can also be computed, and the following results are obtained:

$$VS1 = 2.631579(V)$$

$$VS2 = 2.375000(V)$$

$$VTF = VS1 + VS2 = 5.006579(V)$$

Therefore, when the normal detection range of the failure detection signal is set as "5V±α", the failure detection signal VTF of the magnetostrictive torque sensor 300 of the present embodiment can have a considerably small value of α in comparison with the failure detection signal VTF' of the magnetostrictive torque sensor in FIG. 12. Therefore, in the present embodiment, erroneous failure detection does not occur even when the margin of the failure detection range is narrowed, thereby resulting in improvement of the failure detection accuracy.

In a variation of the present embodiment, the first magnetostrictive film 31 is divided into two portions along the axis of the pinion shaft 5, and one of the two portions is dedicatedly used as a magnetostrictive film for the first measurement coil 33, and the other is dedicatedly used as a magnetostrictive film for the second measurement coil 34. Similarly, the second magnetostrictive film 32 is divided into two portions in the axial direction of the pinion shaft 5, and one of the two portions is dedicatedly used as a magnetostrictive film for the third measurement coil 35, and the other is dedicatedly used as a magnetostrictive film for the fourth measurement coil 36. Therefore, an arrangement using four magnetostrictive films is possible.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the present invention is not restrictively applied to an electric power steering system as described in the above embodiments, and may be applied to a steering system for a vehicle, which employs a steering by wire system. In the steering by wire system, a steering device is mechanically separated from a steering mechanism, and a steering motor provided at the steering mechanism is driven according to steering torque applied to the steering device, so as to steer the steered wheels of the vehicle. The magnetostrictive torque sensor according to the present invention can be used for measuring the steering torque applied to the steering device in this system.

What is claimed is:

1. A magnetostrictive torque sensor system, comprising:
a magnetostrictive torque sensor including:
a first magnetostrictive film and a second magnetostrictive film, which are provided at a shaft and have different magnetic anisotropies;
a first measurement coil and a second measurement coil which face the first magnetostrictive film; and
a third measurement coil and a fourth measurement coil which face the second magnetostrictive film, wherein:
a torque applied to the shaft is measured based on a variation in magnetic characteristics of the first and the second magnetostrictive films; and
an electronic control unit including a device for detecting a failure of the magnetostrictive torque sensor is detected based on the sum of a first difference between output values from the first and the second measurement coils and a second difference between output values from the third and the fourth measurement coils.

2. The magnetostrictive torque sensor system as claimed in claim 1, wherein said detecting device detects the failure of the magnetostrictive torque sensor when the sum of the first difference and the second difference exceeds a predetermined threshold range.

3. The magnetostrictive torque sensor system as claimed in claim 1, wherein the torque applied to the shaft is measured based on one of a third difference between output values from the first and the third measurement coils, and a fourth difference between output values from the second and the fourth measurement coils.

4. The magnetostrictive torque sensor system as claimed in claim 1, wherein the torque applied to the shaft is measured based on a difference between a third difference between output values from the first and the third measurement coils and a fourth difference between output values from the second and the fourth measurement coils.

5. An electric steering system for a vehicle, comprising:
said magnetostrictive torque sensor as claimed in claim 1, for measuring a steering torque of the steering system; and
an electric motor for steering the vehicle;
wherein said electronic control unit which drives the electric motor based on the measured magnetostrictive torque.

6. A magnetostrictive torque sensor system for a vehicle, wherein:
the vehicle has a steering shaft, an upper end of which is coupled with an operating device, and a lower end of which is coupled with a gear mechanism contained in a steering gear box in an engine room, and
the magnetostrictive torque sensor system comprises:
a magnetostrictive torque sensor including;
a first magnetostrictive film and a second magnetostrictive film, which are provided at the steering shaft, wherein a torque input into the steering shaft is measured based on a variation in magnetic characteristics of the magnetostrictive films;
a first measurement coil and a second measurement coil which face the first magnetostrictive film; and
a third measurement coil and a fourth measurement coil which face the second magnetostrictive film, wherein:
the first measurement coil, the second measurement coil, the third measurement coil, and the fourth measurement coil are arranged in this order along the axis of the steering shaft, wherein the first measurement coil is closest to the operation device; and
an electronic control unit including a device for detecting an abnormal state of the magnetostrictive torque sensor is detected based on the sum of an intermediate output signal between the first measurement coil and the third measurement coil, and an intermediate output signal between the second measurement coil and the fourth measurement coil.

7. The magnetostrictive torque sensor system as claimed in claim 6, wherein:
the intermediate output signal between the first measurement coil and the third measurement coil corresponds to a difference between signals output from these measurement coils; and
the intermediate output signal between the second measurement coil and the fourth measurement coil corresponds to a difference between signals output from these measurement coils.

* * * * *